United States Patent [19]

Kitagawa et al.

[11] Patent Number: 4,821,822

[45] Date of Patent: Apr. 18, 1989

[54] METHOD AND APPARATUS FOR ADJUSTING RESISTORS IN LOAD-CELL SCALE

[75] Inventors: Tohru Kitagawa, Mishima; Yoshihisa Nishiyama, Shizuoka, both of Japan

[73] Assignee: Tokyo Electric Co., Ltd., Tokyo, Japan

[21] Appl. No.: 25,397

[22] Filed: Mar. 13, 1987

[30] Foreign Application Priority Data

Mar. 25, 1986 [JP] Japan .................. 61-66310

[51] Int. Cl.$^4$ .......................... G01G 3/14; G01L 1/22
[52] U.S. Cl. ....................................... 177/211; 177/1; 338/2; 73/862.67
[58] Field of Search .............. 177/211, 1; 338/2; 73/862.67

[56] References Cited

U.S. PATENT DOCUMENTS

| | | |
|---|---|---|
| 4,294,322 | 10/1981 | Nishiyama . |
| 4,432,247 | 2/1984 | Takeno et al. .................. 338/2 X |
| 4,572,309 | 2/1986 | Nishiyama . |
| 4,580,644 | 4/1986 | Nishiyama . |
| 4,630,491 | 12/1986 | Kitagawa et al. .................. 338/2 X |
| 4,633,721 | 1/1987 | Nishiyama .................. 338/2 X |

Primary Examiner—George H. Miller, Jr.
Attorney, Agent, or Firm—Frishauf, Holtz, Goodman & Woodward

[57] ABSTRACT

A resistor-adjusting apparatus is provided for adjusting resistors of a load-cell scale which has a load cell, having a resistance bridge circuit, for generating an electrical signal corresponding to a load weight, and an A/D converting section for converting the electrical signal supplied from the load cell into a digital signal corresponding to the load weight. A thin-film resistor for adjusting temperature characteristic, which is connected to the bridge circuit, is provided on the load cell so as to be exposed. The resistor-adjusting apparatus comprises a resistor adjustor for removing part of the thin-film resistor in response to a control signal and thus adjusting a resistance thereof, and a control unit for supplying, to the resistor adjustor, a control signal corresponding to digital signals that are generated by the A/D converting section in response to a predetermined load weight at different temperatures, causing the resistor adjustor to change the resistance of the thin film resistor.

10 Claims, 2 Drawing Sheets

F I G. 3
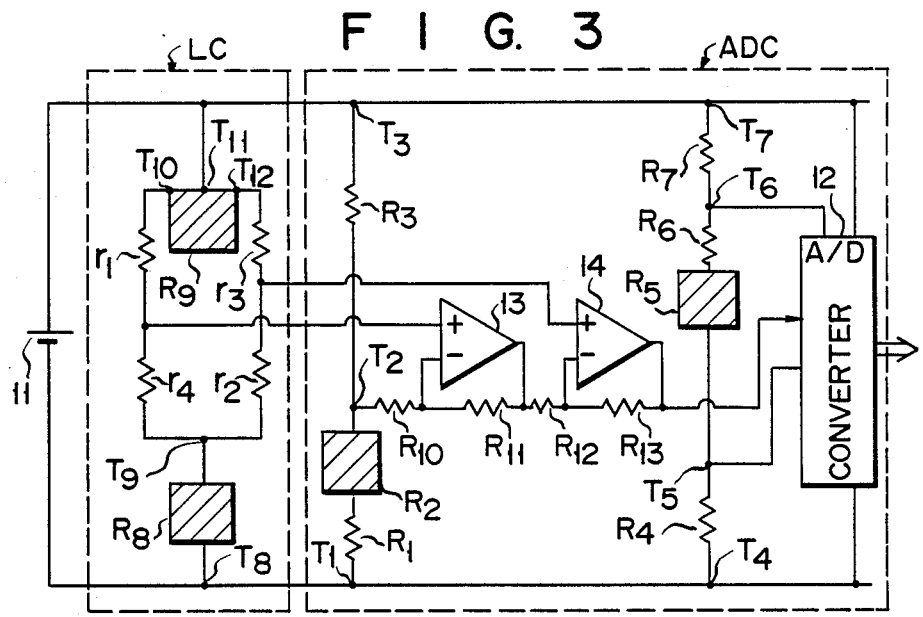
F I G. 4
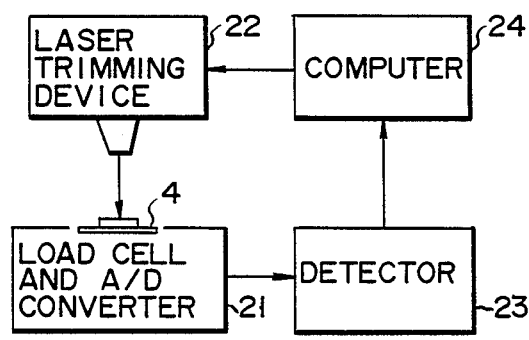
F I G. 5A
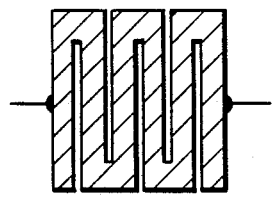
F I G. 5B
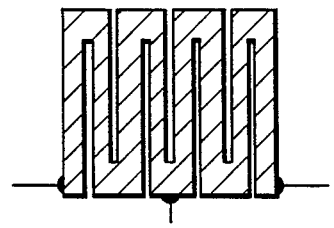

METHOD AND APPARATUS FOR ADJUSTING RESISTORS IN LOAD-CELL SCALE

BACKGROUND OF THE INVENTION

The present invention relates to a method and apparatus for adjusting resistors used in a load-cell scale.

Generally, in a load-cell scale, an electrical signal corresponding to a load is generated by a load cell. The electrical signal is converted into a digital signal corresponding to the load weight by an amplifier and an A/D converting circuit having an A/D converter. The digital signal is read by a microcomputer and is converted into corresponding weight data in units of, e.g., grams. The weight data is converted into display data and is output to a display.

In a load-cell scale of this type, it is quite important to reliably set the temperature characteristics in order to improve the precision. For this purpose, in a scale manufacturing step, the resistors in the load cell and the A/D converter must be adjusted in order to adjust the temperature characteristics.

Such adjustment is conventionally performed separately in the load cell and the A/D converting section. In order to achieve a predetermined level of precision as a whole, considerably high precisions are required for the adjustments of the resistors in the load cell and the A/D converting section, resulting in a time-consuming adjustment operation. Also, since the resistors to be used must be made highly accurate, the load-cell scale is expensive. Since resistor adjustment is conventionally performed using a variable resistor, it must be performed manually, resulting in a further time-consuming adjustment operation.

In another method, a load cell and an A/D converting section are arranged close to each other and the adjustment of their temperature characteristics is performed under the same temperature conditions. With this method, however, the adjustment of the resistors must be performed manually using a variable resistor, resulting in a time-consuming operation.

In a load cell scale, resistor adjustment must be performed not only for setting temperature characteristics but also for setting a zero point or a span. The same problems as described above also arise in this case.

SUMMARY OF THE INVENTION

It is an object of the present invention to provide a method and apparatus for adjusting resistors used in a load-cell scale, which can easily adjust resistors for setting their temperature characteristics to fall within a predetermined range and can automate the resistor adjustment.

The above object is achieved by a resistor adjusting apparatus used for a load-cell scale which comprises a load cell having a resistor bridge circuit including at least one temperature characteristic-adjustment thin-film resistor provided to be exposed, for generating an electrical signal corresponding to a load, and an A/D converting section for converting the electrical signal supplied from the load cell into a digital signal corresponding to the load, comprising a resistor-adjusting unit for removing part of the thin-film resistor of the bridge circuit of the load-cell scale in response to a control signal, thereby adjusting a resistance of the thin-film resistor, and a control unit for supplying, to the resistor adjusting unit, a control signal determined by digital signals that are generated by the A/D converting section in response to a predetermined load at different preset temperatures, causing the resistor adjusting unit to change the resistance of the thin-film resistor.

According to the present invention, the resistance of a resistor of a bridge circuit of a load cell which is used for adjusting the temperature characteristic is changed in accordance with output digital signals generated from the A/D converting section at different preset temperatures. Therefore, a high-precision load-cell scale which is less influenced by a temperature variation can easily be obtained.

BRIEF DESCRIPTION OF THE DRAWINGS

FIG. 3 is a circuit diagram of the load cell shown in FIG. 1 and an A/D converting section;

FIG. 4 the resistor-adjusting apparats adjusting the resistors in the load-cell scale shown in FIG. 1 according to the embodiment of the present invention; and FIGS. 5A and 5B show pattern examples of a resistor whose resistance is adjusted by the resistor-adjusting apparatus according to the embodiment of the present invention.

DETAILED DESCRIPTION OF THE PREFERRED EMBODIMENT

Figure 1:
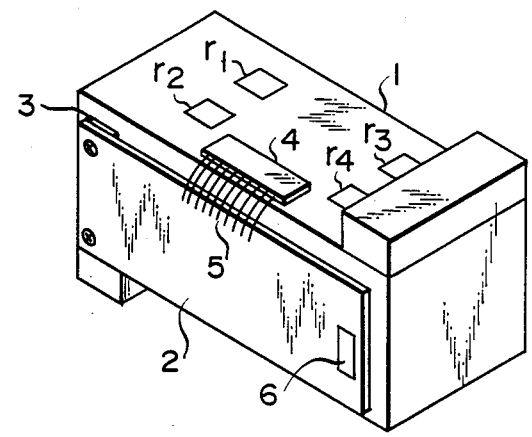
FIG. 1 shows an outer appearance of a load-cell scale whose resistors are adjusted by a resistor-adjusting apparatus according to an embodiment of the present invention.

FIG. 1 shows load-cell scale whose resistors are adjusted by a resistor adjusting apparatus according to an embodiment of the present invention. This load-cell scale comprises load-cell frame 1 and circuit board 2 having one end fixed by screws to the side surface of frame 1 through insulating washer 3 and on which an A/D converting circuit is formed. Four strain gauges r1, r2, r3, and r4, constituting the bridge circuit of the load cell, are separately attached through respective insulation films to the upper surface of frame 1 in its distortion generating sections by a known method. Thin film resistor 4 is adhered directly to the upper surface of frame 1 in an area other than the distortion generating section, and lead wires 5 of resistor 4 are connected to circuit board 2. Resistor 4 is obtained by depositing fixed resistors and adjustable resistors, each comprising a thin-film resistor, on a ceramic substrate. Connector 6 for extracting a signal to be supplied to an external microcomputer (not shown) is mounted on one end of board 2.

Figure 2:
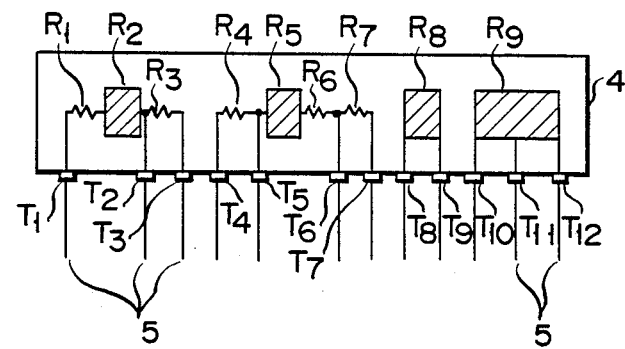
FIG. 2 shows an arrangement of thin-film resistors used in a load cell shown in FIG. 1.

As shown in FIG. 2, thin film resistor 4 has a series circuit of fixed resistor R1, adjustable resistor R2, and fixed resistor R3; another series circuit of fixed resistor R4, adjustable resistor R5, and fixed resistors R6 and R7; and adjustable resistors R8 and R9. These resistors are formed of thin films. One end of resistor R1 is connected to lead wire 5 by terminal T1. The node of resistors R2 and R3 is connected to another lead wire 5 by terminal T2. The other end of resistor R3 is connected to a different lead wire 5 by terminal T3. One end of resistor R4 is connected to a different lead wire 5 by terminal T4. The node of resistors R4 and R5 is connected to corresponding lead wire 5 by terminal T5. The node of resistors R6 and R7 is connected to corresponding lead wire 5 by terminal T6. The other end of resistor R7 is connected to corresponding lead wire 5 by terminal T7. One end of resistor R8 is connected to corresponding lead wire 5 by terminal T8, and its other end is connected to corresponding lead wire 5 by terminal T9. One end of resistor R9 is connected to corresponding lead wire 5 by terminal T10, its intermediate point is connected to corresponding lead wire 5 by terminal T11, and its other end is connected to corresponding lead wire 5 by terminal T12.

FIG. 3 shows a circuit configuration of load cell LC and A/D converting section ADC for converting an output signal supplied from load cell LC into a digital signal. The positive terminal of DC power source 11 is connected to terminals T3, T7, and T11, and its negative terminal is connected to terminals T1, T4, and T8. DC power source 11 is also connected to A/D converter 12.

A series circuit of strain gauges r1 and r4 is connected between terminals T10 and T9, and a series circuit of strain gauges r3 and r2 is connected between terminals T12 and T9. Terminal T2 is connected to the inverting input terminal (−) of operational amplifier 13 by resistor R10. Resistor R11 is connected between the inverting input terminal (−) and the output terminal of amplifier 13. The output terminal of amplifier 13 is connected to the inverting input terminal (−) of operational amplifier 14 by resistor R12. Resistor R13 is connected between the inverting input terminal (−) and the output terminal of amplifier 14. The output terminal of amplifier 14 is connected to the input terminal of A/D converter 12.

Non-inverting input terminal (+) of operational amplifier 13 is connected to the node of strain gauges r1 and r4, and that of operational amplifier 14 is connected to the node of strain gauges r3 and r2.

Terminal T6 is connected to supply a reference voltage to A/D converter 12. Terminal T5 is also connected to set the ground potential of converter 12.

A/D converter 12 converts a signal from operational amplifier 14 into a digital signal, and outputs this digital signal which corresponds to the load supplied from load cell LC. This output is supplied to a microcomputer via connector 6.

Of adjustable resistors R2 R5, R8, and R9, resistor R2 serves as a zero-point setting resistor, resistor R5 serves as a span-setting resistor, resistor R8 serves as a span-temperature characteristic setting resistor, and resistor R9 serves as a zero-point temperature characteristic-setting resistor.

Circuit component 21, including load cell LC and A/D converting section ADC having the above arrangements are supplied to a manufacture line. A known Laser trimming device 22, detector 23 and computer 24 are provided along the manufacture line. In order to adjust the resistors, circuit component 21 is first put under different temperatures, for example, −10° C. and 40° C. with a predetermined load weight applied to load cell LC, and respective digital signals from A/D converter ADC are detected by detector 23. These detected signals are supplied to computer 24. Computer 24 determines a control signal from the digital signals and supplies a control signal to a laser trimming device. The control signal can be produced by using a predetermined equation which represents the relationship between the desired resistances of resistors R2, R5, R8 and R9 and digital signals from A/D converter 12.

Then, in response to the control signal, device 22 emits a laser beam, onto adjustable resistors R2, R5, R8 and R9 of thin-film resistor 4 adhered on load cell frame 1, as shown in FIG. 4, thereby performing the laser trimming. As a result, the adjustable resistors are cut away at a predetermined portion or portions by a length determined by the control signal received.

Thus, adjustable resistors R2, R5, R8 and R9 are trimmed by laser trimming device 22 according to the received control signal such that the distance between two or three terminals is changed as shown in FIGS. 5A and 5B.

When the resistor adjustment of adjusting resistor R8 for setting span-temperature characteristics, adjusting resistor R9 for setting zero-point temperature characteristics adjusting resistor R2 for setting a zero point and adjusting resistor R5 for setting a temperature span is performed in the above manner, it can be done under a condition that load cell LC and A/D converting section ADC are integrated. Therefore, since adjustment can be performed to attain a constant precision as a whole, it can be done easily as compared with a case where load cell LC and A/D converting section ADC are adjusted separately. In addition, since respective resistors R2, R5, R8, and R9 are adhered to the upper surface of load cell frame 1 and can be adjusted under the same temperature conditions as for load cell LC, the temperature characteristics can be adjusted more precisely.

Since respective adjusting resistors R2, R5, R8, and R9 are made of thin-film resistors and are adjusted by trimming using a laser beam, the adjustment can be automated and can be easily incorporated in the scale manufacture line. As a result, the adjustment operation becomes quite easy.

Although an embodiment of the present invention has been described, the present invention is not limited to this. For example, in the above embodiment, digital signals generated by A/D converter 12 while a predetermined load is applied to load cell LC at temperatures of −10° and 40° are used. However, the temperature can be changed or three or more detection temperatures can be used. For example, at temperatures of −10°, 15°, and 40°, digital signal supplied from A/D converter 12 are detected, and resistors R2, R5, R8, and R9 can be adjusted based of the detected digital signals.

Furthermore, resistors R2 and R5 can be replaced by fixed resistors. In this case, only resistors R8 and R9 are adjustable.

What is claimed is:

1. A resistor-adjusting apparatus used for a load-cell scale, comprising:

a load cell including a frame and having a resistor bridge circuit including exposed temperature characteristic adjustable thin film resistor means mounted on said frame, for generating an analog electrical signal corresponding to a load weight applied to said frame;

an A/D converting section mounted on said frame for converting the analog electrical signal supplied from said bridge circuit into a digital signal corresponding to the load weight;

resistor-trimming means for removing part of the exposed adjustable thin film resistor means of said bridge circuit of said load cell scale in response to a control signal and adjusting a resistance of said thin film resistor means; and control means for supplying, to said resistor-trimming means, a control signal functionally related to digital signals generated by said A/D converting section in response to a predetermined load at selected ones of different temperatures, and for causing said resistor-trimming means to remove said part of said exposed thin film resistor means to thereby adjust the resistance of said thin film resistor means according to said control signal.

2. An apparatus according to claim 1, wherein said resistor trimming means comprises a laser trimming device.

3. An apparatus according to claim 2, wherein said control means includes detecting means for detecting the digital signals supplied from said A/D converting section, and computer means for generating the control signal based on the digital signals detected by said detecting means.

4. An apparatus according to claim 3, wherein said temperature-characteristic adjustable thin-film resistor means includes a span temperature characteristic setting resistor and a zero point temperature characteristic setting resistor.

5. A resistor-adjusting apparatus used for a load cell scale, comprising:

a load cell including a frame and having a resistor bridge circuit including a span temperature characteristic-adjusting thin-film resistor and a zero-point temperature characteristic-adjusting thin-film resistor which are externally exposed, for generating an electrical signal corresponding to a load weight applied to said frame;

an A/D converting section mounted on said frame and including a span-temperature characteristic thin-film resistor and a zero-point setting thin film resistor which are exposed, for converting the electrical signal supplied from said bridge circuit into a digital signal corresponding to the load weight;

resistor trimming means for removing parts of said thin film resistors of said bridge circuit and said A/D converting section in response to a control signal and adjusting resistances of said thin film resistors; and control means for supplying, to said resistor-trimming means, a control signal functionally related to digital signals generated by said A/D converting section in response to a predetermined load at selected ones of different temperatures, and for causing said resistor-trimming means selectively to adjust the resistances of said thin film resistors according to said control signal.

6. An apparatus according to claim 5, wherein said resistor-trimming means comprises a laser trimming device.

7. An apparatus according to claim 6, wherein said control means includes detecting means for detecting the digital signals supplied from said A/D converting section, and computer means for generating the control signal based on the digital signals detected by said detecting means.

8. A resistor adjusting method comprising the steps of:

preparing a load cell scale by arranging a load cell and an A/D converting section on a common frame;

providing the load cell with a resistor bridge circuit including at least one temperature characteristic-adjusting adjusting thin-film resistor, arranging the bridge circuit for generating an electrical signal corresponding to a load applied to the frame, and exposing part of the thin-film resistor for trimming;

arranging said A/D converting section for converting the electrical signal supplied from said bridge circuit into a digital signal corresponding to the load;

detecting digital signals generated by said A/D converting section when a predetermined load weight is applied to said frame at selected ones of different temperatures; and trimming the exposed part of said thin-film resistor of said bridge circuit in response to a detected digital signal, thereby selectively adjusting the resistance of said thin-film resistor.

9. A method according to claim 8, including providing said A/D converting section with a zero-point setting thin-film resistor and a span-setting thin-film resistor parts of which are exposed in the same manner as the thin film resistor of said bridge circuit, and trimming the exposed parts of said zero-point setting thin-film resistor and said span-setting thin-film resistor in response to detected digital signals of said A/D converting section, thereby selectively adjusting the resistances of said thin-film resistors.

10. A method according to claim 8, including disposing the thin-film resistor of the bridge circuit in an area of the frame other than a distortion generating section of said frame.

* * * * *